METHOD OF CONSTRUCTING MISSILE TANK HAVING PRETENSIONED SIDEWALL
Original Filed Aug. 12, 1960 4 Sheets-Sheet 1
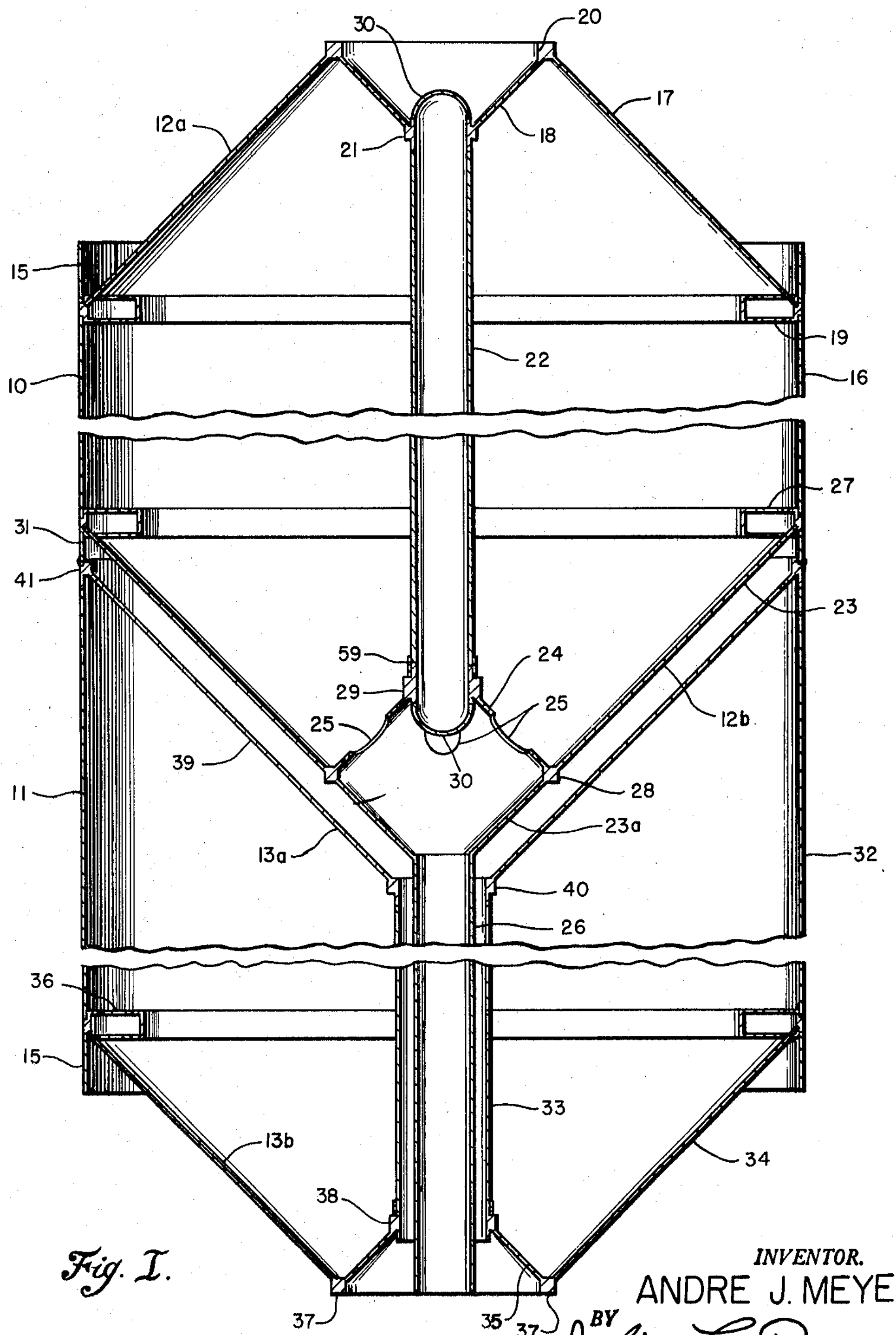
Fig. I.
INVENTOR.
ANDRE J. MEYER
BY Julian C. Renfro
ATTORNEY

METHOD OF CONSTRUCTING MISSILE TANK HAVING PRETENSIONED SIDEWALL

Original Filed Aug. 12, 1960 4 Sheets-Sheet 2

INVENTOR.
ANDRE J. MEYER
BY Julian C. Renfro
ATTORNEY

METHOD OF CONSTRUCTING MISSILE TANK HAVING PRETENSIONED SIDEWALL

Original Filed Aug. 12, 1960

INVENTOR.
ANDRE J. MEYER
BY Julian C. Renfro
ATTORNEY

April 19, 1966 A. J. MEYER 3,246,394
METHOD OF CONSTRUCTING MISSILE TANK HAVING PRETENSIONED SIDEWALL
Original Filed Aug. 12, 1960 4 Sheets-Sheet 4
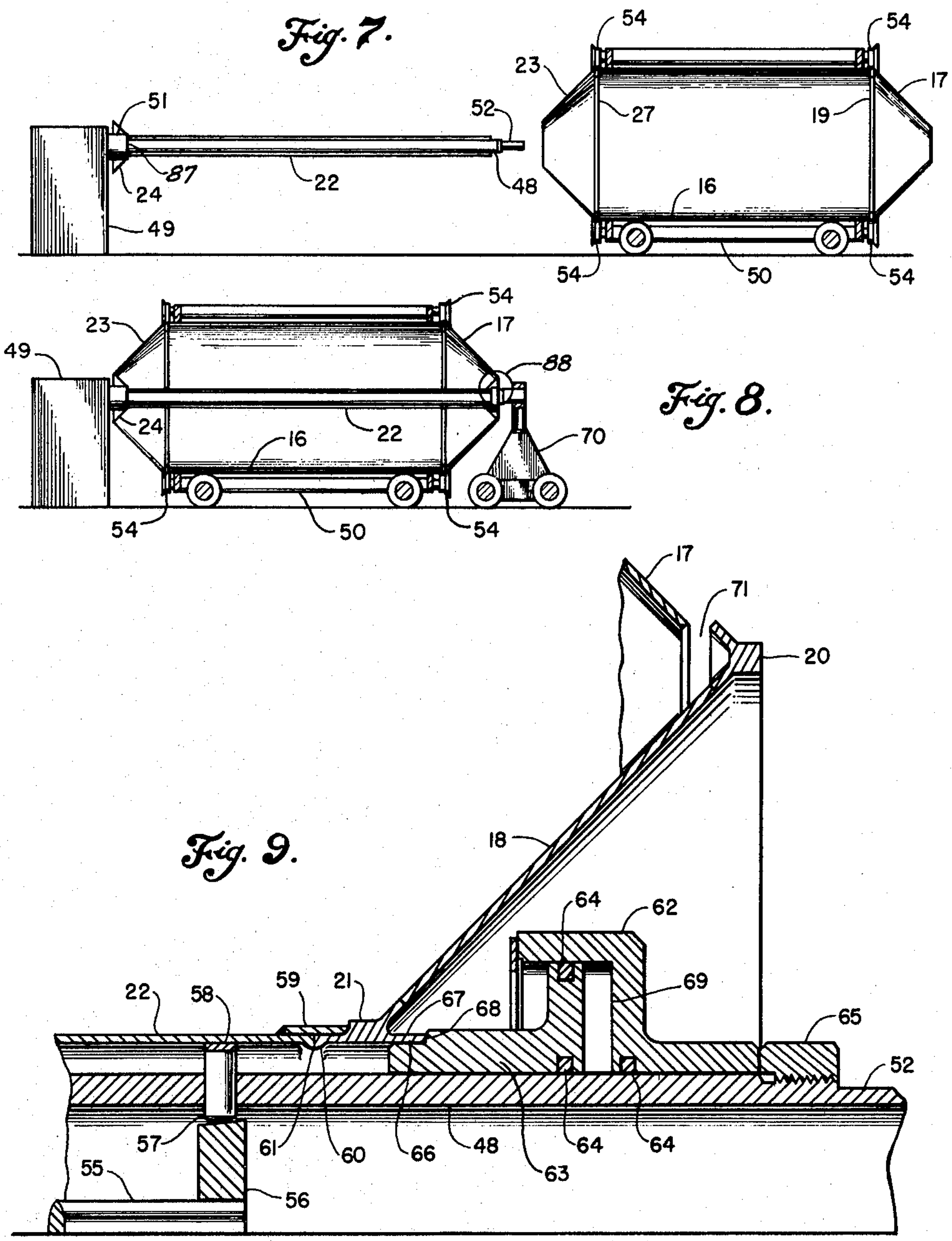
INVENTOR.
ANDRE J. MEYER
BY Julian C. Renfro
ATTORNEY 3,246,394
Patented Apr. 19, 1966

3,246,394

METHOD OF CONSTRUCTING MISSILE TANK HAVING PRETENSIONED SIDEWALL

Andre J. Meyer, Arapahoe County, Colo., assignor to Martin-Marietta Corporation, a corporation of Maryland Original application Aug. 12, 1960, Ser. No. 49,203. Divided and this application Feb. 26, 1965, Ser. No. 442,565
5 Claims. (Cl. 29—446)

This is a division of my earlier patent application entitled "Missile Tank Having Buckling Resistant Pretensioned Sidewall," filed August 12, 1960, Serial No. 49,203.

This invention relates to fluid containers in the nature of propellant tanks for missiles, and more specifically to a method of manufacturing containers which are subject to heavy external axial loads as well as to internal hydrostatic and/or gas pressure associated with fluids stored inside such a tank.

Because of high accelerations, the axial loads imposed upon vehicles such as missiles and rockets may reach values of up to ten times the weight of the structure or payload of said vehicles. These loads, according to present rocket design practice, are impressed by payloads as well as by fluid fuel hydrostatic loading onto the supporting exterior walls of propellant or fuel tanks, which are in turn positioned upon a propulsion unit. In that the energy imparted by a rocket engine to the payload is generally proportional to the square of the logarithm of the take-off to burnout mass ratio, the structure of a missile must be of the lightest possible design while still maintaining strength to resist acceleratively imposed forces.

Potential design considerations for reducing tank structural weight are limited by the physical properties of the material used and by the production difficulties in the handling of very thin metal sections. As missiles are scaled to larger size, their corresponding larger metal sections become less vulnerable to manufacturing mishaps, while material stress limitations are unchanged. After a missile design has reached that stage where all metal sections are only limited by material properties, the mere "scaling up" of dimensions to provide a larger vehicle will result in stresses surpassing the stress limits set by materials. Hence an enlarged missile must be made heavier than indicated by the scaling factor. Thus conventional construction, scaled up beyond a certain point, leads to lower mass ratio and hence to loss of performance. Therefore, if efficiency is to be maintained, structures of lighter weight must be developed. This requirement for a lower weight than imposes a design requirement of thinner tank walls combined with improved supporting structures. A serious deficiency of thin tank sidewall configurations, however, is their lack of compressive strength, presenting the problem of buckling and subsequent major compressive failure under acceleratively imposed loads. These same tank sidewalls conversely can sustain a very high tensile load. For example, a typical ten-foot diameter missile tank sidewall constructed to sheet metal having 0.050 inch thickness can be loaded to only about 25,000 pounds in compression, yet in service it must support much heavier acceleratively imposed loads. In tension however, such a tank sidewall can sustain a 1,000,000 pound load.

In conventional missile tank design, the sidewalls are reinforced by means of integral I-beam stringers, framing rings and/or corrugated sheet. This type of construction is expensive, and does not prevent all local buckling between the stringers or other supports. Conventional tanks sometimes are also provided some vertical support by being subjected to tension through the use of an internal gas pressure. Such a pressurization method of support, however, presents a multitude of problems. The method has the disadvantage that a tank without pressurization will, in most cases, collapse under its own weight, thus requiring a controlled internal pressure during its lifetime of active use and storage, by means of complex valving and often, manual control. A more serious objection to the use of pressurization for tank sidewall stability resides in the fact that in addition to the desired tensile stresses produced in the meridians of the tank, this pressurization also produces unwanted hoop stresses in the parallel circles of the sidewall. These hoop stresses become twice as high as the longitudinal meridian stresses, and as a consequence impose a design demand requiring a sidewall thickness of about three times that thickness required to contain the fluid without pressurization.

A method of constructing a tank according to this invention may comprise the steps of positioning the column over an arbor arrangement and placing an assembly constituted by the tank sidewalls and end structures or portions thereof over and in proper alignment with the column. Jacking means can then be actuated to compressively strain the column so that the final assembly and connection of the end structures may be effected. Upon releasing the jacking means, and removal of the arbor assembly, the tank is in a state of prestress and is ready for further assembly within the overall missile structure.

As is therefore to be seen, by the practice of the method in accordance with this invention, the sidewalls of a tank are preloaded in tension by means of a centrally disposed compression member within the tank. The centrally disposed compression member abutts against a unique tank end configuration to resolve its energy of prestress into longitudinal tension without the tank sidewalls. Sidewalls so pretensioned in conjunction with a centrally disposed compression member provide an inherently more stable tank structure, thereby restricting the need for reinforcement such as stringers, framing rings and the like. The longitudinal or meridian prestress provided in a tank sidewall by this invention will also minimize or eliminate the occurrence of undesirable hoop stresses within the sidewall, thereby allowing the use of substantially thin sidewall thicknesses. The provision of a thinner sidewall and the elimination of the need for sidewall reinforcement in such a tank design can provide an important reduction in overall missile weight. Utilizing a compression member such as a centrally disposed prestressed column to prestress the sidewalls, eliminates those storage and movement problems brought about in pretensioning by an internally imposed gas pressure.

By the use of my novel method, a system of such tanks for a missile serving as a portion of the missile structure as well as for carrying liquid propellants or the like may be provided, wherein two or more tanks are disposed in longitudinal alignment, having end structures connected to the sidewalls to define each tank, and having a load bearing column disposed along the centerline of the tanks.

This column is connected between the central portions of the end structures, and is of a length normally greater than the distance between those connections. However, the column is compressively prestressed before the final assembly of the end structures upon the tank sidewalls whereby the precompressive energy of the constrained column is transmitted as a force of tension upon the sidewalls. Such a tension in the sidewalls will serve to prevent the buckling thereof under operational conditions as well as during missile storage. The load bearing column may extend substantially the combined length of both tanks to be prestressed separately between the end structures of each of the tanks, or it may be compressively prestressed between the extreme end structures of the tank system.

A preferred embodiment of the invention achieved by the practice of my novel method provides a tank system as above but having a plurality of separate, prestressed columns, one of which is disposed in each missile tank to pretension the sidewalls thereof. A column of tubular configuration may function additionally as a storage compartment for pressurized fluids such as helium and the like.

A series of such tanks in aligned relationship along the centerline of a missile are preferably employed having the end structures of adjacent tanks being of complementary configuration to be in interfitting relationship, one being convexly formed to join within another of concave configuration thereby enhancing the structural integrity of the union between the tanks. Such an interfitting junction betwen the tanks also provides an efficient utilization of space within the missile by minimizing the space lost between end structures which are designed to resolve substantial, longitudinally directed forces.

These end structures may have several configurations, however those described in accordance with this invention are of unique design, being composed in one instance of a pair of concentrically disposed conical members. An inner of these cones abutts against one end of the prestressed column, and the other is connected intermediate the inner cone and the tank sidewall. Stresses emanating from the prestressed column may then compress the inner cone which, in turn, transmits these stresses as tension in the intermediate cone and the tank sidewall connected thereto. In another configuration only one compression sustaining cone is utilized. Of course, the cones may be positioned to sustain forces in the reverse order.

The resolution of forces within the end structures, the precompressed column, and the tank sidewall is effected by a unique annular ring configuration positioned at the junction between any of these juxtaposed components.

An ancillary portion of this invention achieved by the practice of my novel method may involve the provision of an extension chamber interposed between the precompressed column of the tank and an end structure. This chamber is expandable along the missile centerline, being under substantial pressure so as to extend the effective length of the column concomitantly with a longitudinal sidewall elongation brought about by temperature changes or the like. By its use, the column will communicate a generally consistent force to induce tensile stress within the sidewall under a wide range of ambient conditions.

Other objects, features and advantages of this invention will become apparent from a study of the drawings in which:

FIGURE 1 is a cross-sectional view taken vertically through the propellant tanks of a missile to reveal the prestressed central column arrangement employed according to this invention;

FIGURE 7 is a typical arrangement for manufacturing a tank according to this invention, involving the use of an arbor over which the central column of the missile is disposed preparatory to the missile tank being secured to the column;

FIGURE 8 represents the sequence immediately following FIGURE 7, showing the tank in position over the arbor preparatory to the final welding step; and FIGURE 9 is a cross-sectional view, greatly enlarged, of the details associated with the inner and outer cones of the missile end section.

Figures 2, 3, 4, 5:
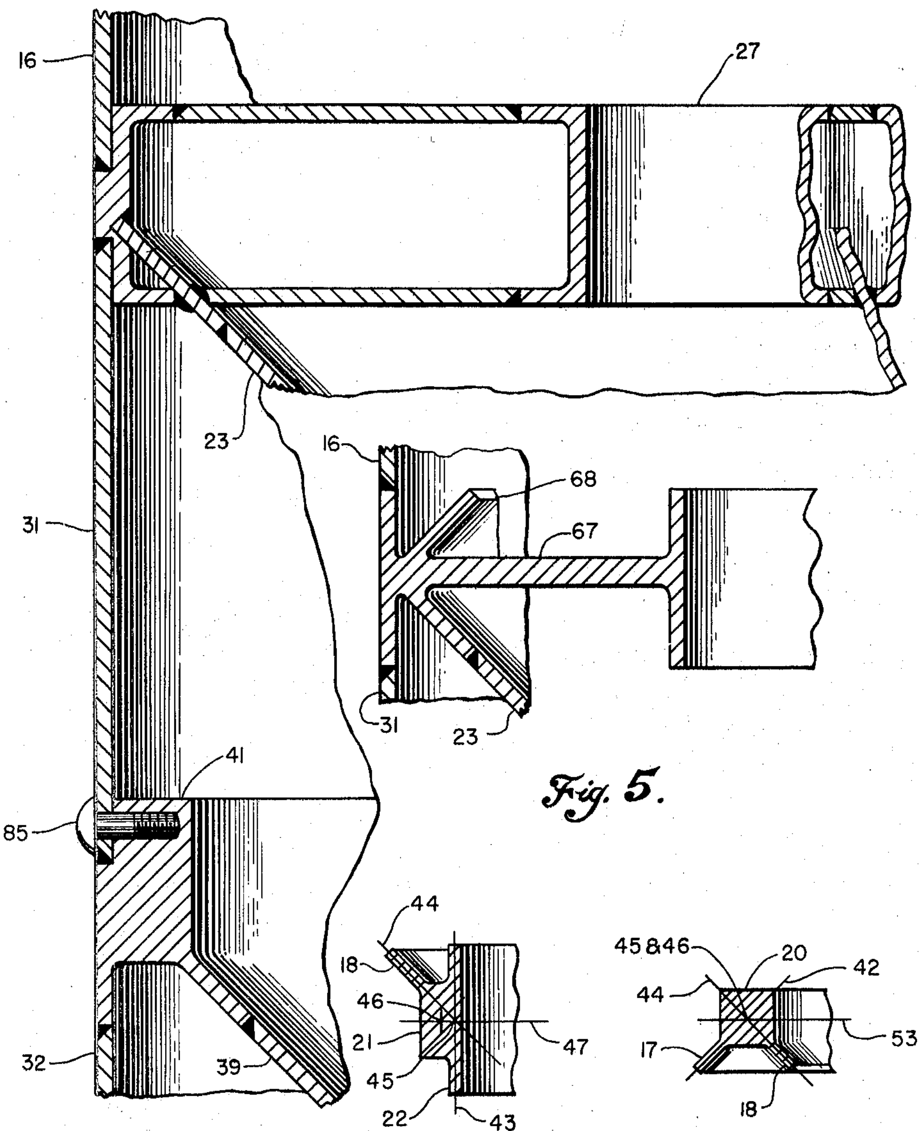
FIGURE 2 is a detail view showing an annular ring utilized for joining one of the cone members of an end portion to the central column.
FIGURE 3 is a detail view of an annular ring employed for joining together the tension and compression cones of the end structure of a missile.
FIGURE 4 is a detailed view of the construction employed for joining two missile tank sections together, and showing two annular ring configurations.
FIGURE 5 is a detailed view of an alternate embodiment of an annular ring configuration.

Referring to FIGURE 1 it will be seen that a pair of propellant tanks 10 and 11 are disposed in adjacent aligned relation, with adjacent end portions of the two tanks being of complementary configuration permitting them to be nested together. Upper tank 10, which typically would be used for carrying an oxidizer such as liquid oxygen for a missile is constituted by a sidewall 16, and upper and lower end structures **12*a* and 12*b*** respectively.

According to this invention, a central column 22 is employed, being secured between the two ends **12*a* and 12*b* of the tank. However, the construction is quite different than merely this, for the central column 22 is normally of a length greater than the distance between the central portions of the two end sections of the missile. Therefore, it is necessary to prestress the central column compressively during assembly of the tank components in accordance with the present novel method so that when the final assembly has taken place, the central column remains in a generally strained, prestressed condition, thereby causing it to tend to move the end portions of the tank outwardly, thus placing the sidewalls 16 under substantial tension to prevent buckling. It is to be understood that the column 22 and the sidewalls 16** are of substantial length, with these being shown in foreshortened relationship in FIGURE 1.

The end structures of the tank are preferably constructed along the lines indicated in view of the need for these end structures to be of sturdy construction in order to resolve the loading imposed thereupon by the column, while at the same time needing to be of a configuration that will enable two adjacent tanks to be nested together in the interest of conserving space or total missile length. The details of my novel method are set forth hereinafter.

Accordingly, the upper end structure **12*a* is constituted by a cone 17, hereinafter referred to as a tension cone, in combination with an inner cone 18 of smaller diameter hereinafter referred to as a compression cone. As will be seen in greater detail hereinafter, annular ring 21 in connection with compression cone 18 serves to transmit from compressed column 22 forces of compression to compression cone 18. Ring 20, in turn, is subjected to an outwardly directed tensional force by compression cone 18, to resolve and transmit the force as tension upon tension cone 17. The outer periphery of cone 17 is welded or otherwise secured around the periphery of the upper portion of sidewall 16 in a gas-tight manner preferably utilizing an annular structural ring 19 designed to prevent the considerable tension presented by cone 17 from causing it to bring about a destruction of the true circular configuration of the sidewall 16**.

Similarly, the lower end structure **12*b* comprises an annular ring structure 29 in connection upon column 22 with compression cone 24 having openings 25 through which an oxidizer may be easily discharged through a conduit 26. Conduit 26 is positioned inside column 33 of tank 11** to provide a shortened delivery of oxidizer from this tank to propulsion unit, thereby minimizing associated fluid flow friction.

Annular ring 28, as in the case of its counterpart in the upper end structure, resolves and transfers stress from compression cone 24 to tension cone 23 which in turn disposes that stress within annular ring 27, which is utilized for the same force resolving purpose as its previously described counterpart, ring 19, in the upper end structure. Column 22 is preferably closed by use of the hemispherical end pieces 30 which permit the column to be used as storage for helium or similar fluids. The conical extension 23*a* is then welded to ring 28, and the conduit 26 welded to 23*a*.

The lower, or fuel tank 11 is structurally connected to the oxidizer tank by junction ring 31, which is shown in greater detail in FIGURE 4. Tank 11 is equipped with a precompressed column 33 disposed in general alignment with upper tank column 22. End structure 13*a* of tank 11, unlike the other end structures, is of generally concave construction, and the only cone utilized therein is compression cone 39. Precompressed column 33 transmits its force directly to annular ring 40, which acts against cone 39, which in turn acts against ring 41, and causes substantial tension to be developed in lower tank sidewall 32. As should be obvious, the concave configuration of the upper end of tank 11 enables it to be closely nested with the lower end of upper tank 10, which is of complementary configuration to end structure 13*a*.

Similar to the end structures of the upper tank assembly, the lower tank end structure assembly 13*b* comprises a stress-resolving annular ring 38 in connection with a compression cone 35 which terminates and is joined to annular ring 37. Ring 37 resolves and communicates forces from cone 35 to tension cone 34 which is in connection with a stress resolving annular ring 36. Ring 36 develops a force of tension within the tank skin 32 as is developed at ring 41.

It is to be understood that all connections between tank members such as rings, cones, column, and tank sidewall are gas-tight. Skirts as at 15 serve for connection of the propulsion system or other missile sections. A suitable fuel drainage passageway system can be disposed easily through the lower end structure of the fuel tank.

It is apparent from the above-described figure that at each corner of the tank apparatus, three of its primary structural elements, cone, ring, column, or sidewall are in communication with each other. Each of said elements describes a body of revolution generated about the common axis centerline of the missile. Thusly, for a condition wherein all of the above-named elements are subjected to a stress and any three are in connection at a common point or corner, there are three forces acting at all such corners as junction points in any longitudinal or meridian plane. In that such forces are disposed in different directions, they must be in a state of mutual equilibrium.

As to this equilibrium, FIGURE 2 illustrates a cross-section through a meridian plane at a typical junction as at the joining of cone 18 and column 22. In the figure, point 45 represents the intersection of the centerline 43 of the wall of column 22 and the centerline 44 of the wall of cone 18. In that all meridian sections as described are identical, it follows that all such points as described at 45 are located within a plane normal to the axis of the tank cylinder. Line 47 is representative of the intersection of this plane with that of the paper. The cross-section of ring 21 is positioned such that its center of gravity 46 is contained within the plane described by line 47. Hence the disposition of the above-described lines of force places the center of gravity 46 as well as junction 45 in a common plane normal to the axis of the tank cylinder. Forces generated by a precompressed central tank column as at 22 will when acting on the annular ring as at 21 exert a force vertically upward substantially at point 45. It is understood that such forces are generated by the column are predetermined by procedures known to the art of prestressing a structural member. A vertical force at points 45 will induce compressive forces within cone 18 such that the vertical opposing component of the forces along line 44 will equal the column generated force. The horizontal component of the opposing force within cone 18 loads ring 21 in radial compression. The inherent strength of ring 21 in conjunction with column 22 is such as to equally oppose this impressed force, providing equilibrium of forces at junctions so described by FIGURE 2. Such ring arrangements are shown principally in FIGURE 1 at 21, 29, 38, 40, and 41 wherein the configurations are such that the center of gravity of the ring section at any corner is in a plane determined by the intersection of the tank sidewall and cone coming together at the corner.

Referring to FIGURE 3, a cross-section through a meridian plane of annular ring 20 is illustrated. Herein a vector of force from the above-described compression cone 18 as indicated along line 44 is impressed upon ring 20, subjecting said ring to radial tension. This force at line 18 is transposed at the plane of the center of gravity of ring 20 depicted by a line 53 into an opposing force 42 directed along the general line of forces of tension cone 17, thereby disposing ring 20 to be in a condition of static equilibrium. Similarly, annular ring 37 in conjunction with ones 34 and 35 and annular ring 28 in conjunction with cones 23 and 24 may be described in like manner.

Referring to FIGURE 4, annular ring 27 is displayed at the union of the upper and lower tanks in conjunction with tank junction ring 31 and annular ring 41. Cone 23, under a tension imposed thereupon by suitable means as described hereinbefore, imposes a radially compressive force upon annular ring 27. Ring 27 is then capable of developing a force of tension within tank skin 16. A structural box-like construction having distortion resisting vertical components as well as horizontally disposed compression resisting members is shown for ring 27 to provide suitable rigidity against torsional forces imposed thereupon. Annular rings 19 and 36, being subjected to similar stresses, may have the same configuration. Junction ring 31 is welded to the upper tank at ring 27 and is shown bolted to the lower tank at ring 41 by bolts 85 to allow a facile joining of both tanks. The junction ring 31 may have a minimal longitudinal dimension, as indicated in the figure, to allow a close nesting of the tanks. In the tank system configuration providing separate columns within each tank as described in the figures, this ring sustains a substantial portion of the forces exerted from one tank to another. These forces are mainly acceleratively induced and are therefore compressive, thereby allowing a simple bolted union as at 53. Annular ring 41 for the lower or fuel tank is subjected to radial tension by forces imposed thereupon by the compressive cone 39, and as a result thereof, provides a tensional force within lower tank sidewall 32. In that ring 41 is only under a tensional force and thereby is less susceptible to distortion, its structure is shown to be more compact than the box-type rings described hereinbefore. FIGURE 5 describes an alternate configuration for the above-described box design ring, wherein an I-beam design 67 is used. Should I-beam 67 be used in lieu of box-type ring 27, tension cone 23 and junction ring 31 would be connected as illustrated, however, to insure torsional rigidity, a short, corresponding angular element 68 is provided in opposed relationship with cone 23.

Figure 6:
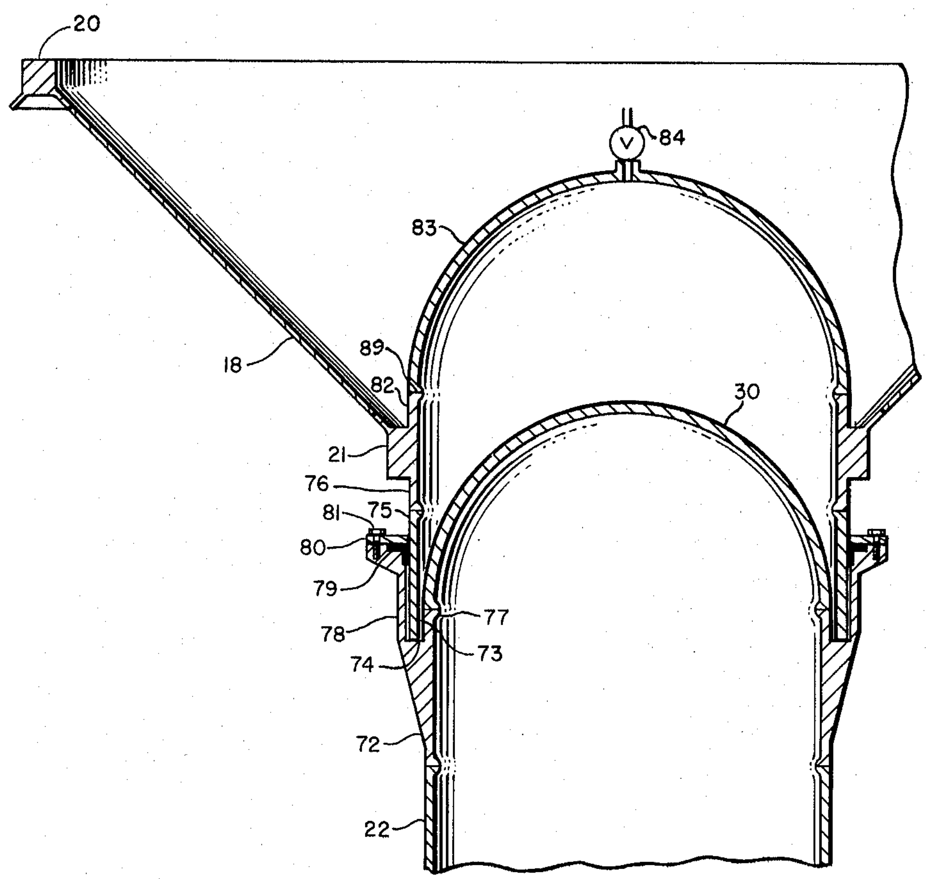
FIGURE 6 is a portion of the upper end of a central column, to a much larger scale, illustrating an extension chamber enabling the column length to change under certain circumstances.

The tank configuration as described thus far is suitable for oxidizers or fluids maintained at approximately room temperature. However, should the missile tank be required to hold a cryogenic fluid, the central precompressed column will remain substantially at the low temperature of the fluid throughout an entire flight, even as the tank empties. The sidewall of the tank, however, will be subjected to aerodynamic heating near the end of a light and consequently will thermally expand in disproportionate relationship with the column. Such a differential of expansion between the column and sidewall could produce an excessive loss of pretension within the sidewall. If the difference in pressure between column and sidewall is sufficiently small, an extra preload upon the column can be utilized to prevent tank collapse. Should this differential be large, however, the initial prestress in the sidewall would be excessive. FIGURE 6 illustrates a column extension chamber arrangement wherein an unduly high column preloading for cryogenic propellant tanks is unnecessary.

In the figure, column 22 is provided with a collar 72 having a groove 73, the bottom of which is indicated at 74. Ring 21, while being slightly larger in diameter than shown in FIGURE 1 is connected to cone 18 as before. A sleeve 75 is welded to the lower extremity 76 of ring 21 and is slidably mounted within the groove 73. The lower end of sleeve 76 rests upon the bottom of groove 74. Collar 72 is provided with an inner extension 77 for the attachment of dome 30 and an outer extension 78 for the support of a chevron type packing ring 79. Packing ring 79 is held in position by a suitable ring at 80 fastened to the outer extension by means of screws 81, and serves to provide a gas-tight slidable union between the column 22 and sleeve 75. Ring 21 also has an upper extremity 82 to which a hemispherical dome 83 may be welded to define a gas-tight extendible chamber between it and dome 30. Dome 83 has a solenoid valve 84 suitable to admit a gas under pressure during a precharging operation.

The extension chamber arrangement may transfer forces of precompression from column 22 through sleeve 75 and ring 21 to compression cone 18 by contacting sleeve 75 at groove bottom 74. However, subsequent to propellant loading, the chamber defined between domes 30 and 83 is filled with a suitable gas under a pressure. This pressure is sufficient to bring the contact pressure between the sleeve 75 and groove bottom 74 substantially to zero.

In that this pressure is maintained during missile flight while the tank sidewall is being heated, separation at this contact point, to the extent of thermal skin expansion will be effected, thereby maintaining a substantially constant stress-strain sidewall relationship and consequently a desired preload upon the tank sidewall. Obviously, the extension chamber as described may be utilized in any of several prestressed tank configurations, and its use is essentially optional, depending upon the existence of a problem of a temperature differential between the central prestressed column and the tank sidewall. In the method for constructing the tank as described hereinafter, the extension chamber may be considered merely at the end portion of the column. However, the assembling of domes 30 and 83 to the chamber arrangement is not made until the tank is prestressed, and the jigging apparatus for its construction is removed.

The precompression of column 22 can be accomplished by any number of suitable methods and devices, however FIGURES 7 and 8 generally illustrate a unique and facile embodiment of method and apparatus for so doing. The general arrangement as will be described, substantially involves the compression straining of the central column of the tank, said column being fabricated having an excess increment of length such as to produce the required stress within the tank sidewall through the conical members of the end structures. In FIGURE 7 a fixture suitable for preloading the column 22 of an oxidizer tank, as described hereinbefore, comprises an arbor 48 extending horizontally in cantilever fashion from a rigid pedestal 49. The tubular arbor arrangement 48 comprises an enlarged section 51 suitable to act as a jigging device for holding compression cone 24, and a reduced section 52, the configuration of which is described in detail in conjunction with FIGURE 9. The arbor, preferably constructed of tubular steel, is rotatably affixed to pedestal 49, freeing it to revolve about its longitudinal axis.

In assembling the column 22 within the tank, column 22 without dome arrangements 30 or 83 is butt welded or secured in appropriate fashion to an assembly consisting of annular ring 29, compression cone 24 and annular ring 28. Thusly composed, the column assembly is slipped over and suitably secured to the arbor with the above-described weldments juxtaposed to arbor enlargement arrangement 51. Also in FIGURE 7, the arrangement of tank sidewalls 16 assembled in connection with tension cones 17 and 23, and annular rings 19 and 27, the combination hereinafter referred to as the tank, is shown removed but aligned with the above described arbor arrangement. The tank is mounted upon rollers 54 which, in turn, are rotatably mounted upon a movable carriage 50. Carriage 50 moves the tank to a position substantially as indicated in FIGURE 8 such that the cylinder described by the sidewall 16 is concentric with the centerline of the column. A mobile dolly as at 70 is positioned to support the arbor, and the cone 23 is welded to the annular ring 28. Encirclement 78 defines the general position of the enlarged column ending and arbor detail shown in FIGURE 9.

Referring to FIGURE 9, a method for securing column 22 to arbor 48 and a mechanism for the compressive straining of said column are illustrated. For the purpose of holding column 22 in proper position, a camshaft 55, centered within arbor 48 carries a cam 56 which, in turn, is in contact with a series of pushrods 57 dispersed angularly around the arbor. Pushrods 57 are in contact with a split ring 58. Axial movement of the camshaft to the left will expand split ring 58 suitably locking column 22 in appropriate centered position upon the arbor. Movement of camshaft 55 to the right will release the column. A guide ring 59 or other device as will be described hereinafter is weldably connected to the end of column 22 to allow a facile positioning of the extremity 60 of annular ring 21, which ring is in appropriate connection with compression cone 18 and annular ring 20. Ring 21 is then butt welded to column 22 at 61, utilizing resistance welding techniques. Following this connection, a jacking device such as a hydraulic ram basically consisting of a cylinder 62 and relating piston 63 having suitable seals 64 is installed upon the arbor in position generally as illustrated in the drawing, wherein both cylinder and piston are capable of sliding upon the arbor 48. A nut 65 threaded to arbor 48 is positioned to secure the hydraulic ram to the arbor. As stated hereinbefore, the unstressed column 22 is provided with an extra increment of length as indicated by the gap at 71, which increment is eliminated by a compressive strain. This strain is initially induced by the above-described hydraulic ram which, as hydraulic fluid is introduced under pressure to the space 69 defined between piston 63 and cylinder 62, piston 63 exerts a force at its section of reduced diameter 66 upon the extremity 67 of the ring 21. This force compresses the column 22 between the shoulder 53 on the arbor and the shoulder 68 on the piston. The arbor is then under tensional influence by the reaction of the cylinder of the hydraulic ram upon the nut 65. As pressure is applied by the hydraulic ram and the column 22 is subjected to strain, the gap 71 between cone 17 and ring 20 reduces in size. When said gap is closed, in turn, ring 20 and cone 17 are weldably connected, and after the weldment has cooled, the hydraulic ram pressure is released, and the tank is thereby subjected to pretensioning forces induced from column 22. The tank is now ready for removal from the arbor assembly and for the welding of domes 30 to the column. Conical extension 23a is then welded to ring 28, and pipe 26 to the bottom of 23a. Dome 83 is connected if the extension chamber arrangement is utilized, electric resistance welding performed in a helium atmosphere being preferred.

As an example of the force involved in compressing the central columns of the tanks, the size of gap 71, and the column load remaining after welding is complete and the jack removed, the following values are given for one large missile:

| | Pre-load, lbs. | Gap, inches | Remaining Column Load, lbs. |
|---|---|---|---|
| Lox Tank | 119,980 | .442 | 72,914 |
| Fuel Tank | 316,690 | .660 | 204,550 |

The loading of the fuel and oxidizer tanks is conventional, that is, the propellant is pumped into the tanks via the drain lines from external pumps. Usually the fill and drain line from the facility comes in horizontally at a point below the tank and above the engine it feeds.

The metal preferred for the tanks herein described in #2014 aluminum alloy. For 10-foot diameter tanks, for example, typical metal thicknesses are .050 inch for the tank sidewalls, whereas the columns would typically have sidewalls between .100 and .200 inches thick.

For a 1500 ft.$^3$ fuel tank, the column 33 was constructed to have a wall thickness of .125 inch and a diameter of 18 inches, whereas a 1700 ft.$^3$ oxidizer tank was constructed to have a column wall thickness of .188 inch for a 12-inch diameter, because of its greater length and also because it must withstand an internal pressure in the order of magnitude of 1000 p.s.i. in order to be an effective storage location for liquid helium. This helium is employed for pressurizing both tanks via conventional pressurizing arrangements, to insure proper delivery pressure to the pumps, and conventional regulating arrangements maintain the oxidizer tank at approximately 22 p.s.i.g., and the fuel tank at about 15 p.s.i.g.

It is to be understood that this invention possesses considerable breadth in presenting a solution to the structural problem of high acceleratively imposed forces upon lightweight tank structures, and should not be limited to the particular embodiment shown. For example, a series of tanks may reside under prestress along only one central column. Such a column may be precompressed only between the end structures of the individual tanks, or it may be precompressed over its entire length. The column extension chamber may easily be modified to be positioned upon the column at locations other than at its extreme end. The end structures as described are unique in being able to be nested together and in their stress resolving configurations. However, they may be reversed to resolve oppositely directed forces, or may take on other configurations to provide stress resolution between the column and tank sidewalls. The steps in the method for constructing the tank as described, of course, may be altered within the spirit of this invention to obtain the same end result.

I claim:

1. The method for constructing a tank having a sidewall maintained in tension by a prestressed central column arrangement reactive upon end structures of said tank comprising the steps of positioning said sidewall and end structures in generally concentric spacial relationship over said column arrangement, compressibly straining said column arrangement, and securing said end structures against said compressibly strained column and to said sidewalls.

2. The method for constructing a tank having a sidewall, end structures, and a centrally disposed column arrangement prestressed by the use of an arbor arrangement disposed along said column arrangement during said construction, comprising the steps of positioning said column arrangement over said arbor assembly, positioning said sidewall and end structures in generally concentric and matching spacial relationship over said column and arbor assemblies, compressibly straining said column arrangement, and securing said end structures to said compressively strained column assembly and to said sidewalls, thereby to define a tank having a central column whose prestress places said sidewall in tension.

3. The method for constructing a tank as defined in claim 2 in which following the positioning of said column assembly over said arbor assembly jacking means is employed in mechanical association between said arbor assembly and said column assembly to compressibly strain said column arrangement, and said arbor assembly and jacking means being removed from said tank following the securing of said end structures to said sidewalls.

4. The method for constructing a tank having sidewalls prestressed by a central column arrangement connected between the end structures of the tank, the prestress of the column being brought about by an arbor assembly, including jacking means, comprising the steps of positioning said column arrangement over said arbor assembly, placing the portion of a tank constituted by a sidewall and one end structure over said column and arbor assembly such that one end of said column arrangement is in connection with said end structure, actuating said jacking means to compressibly strain said column arrangement, positioning the other of said end structures against another portion of said column arrangement and in connection with said sidewall so as to constrain said precompressed column respectively between said end structures, securing said other end structure to said sidewall, and removing said arbor assembly and said jacking means.

5. The method for constructing a tank as defined in claim 4 in which said end structures are weldably connected to said sidewall.

References Cited by the Examiner

UNITED STATES PATENTS 2,806,663 9/1957 Rosenblatt.
3,066,404 12/1962 Jones ---------------- 29—452
3,073,018 1/1963 Gauthron -------- 29—446 XR CHARLIE T. MOON, *Primary Examiner.*

JOHN F. CAMPBELL, *Examiner.*